United States Patent Office

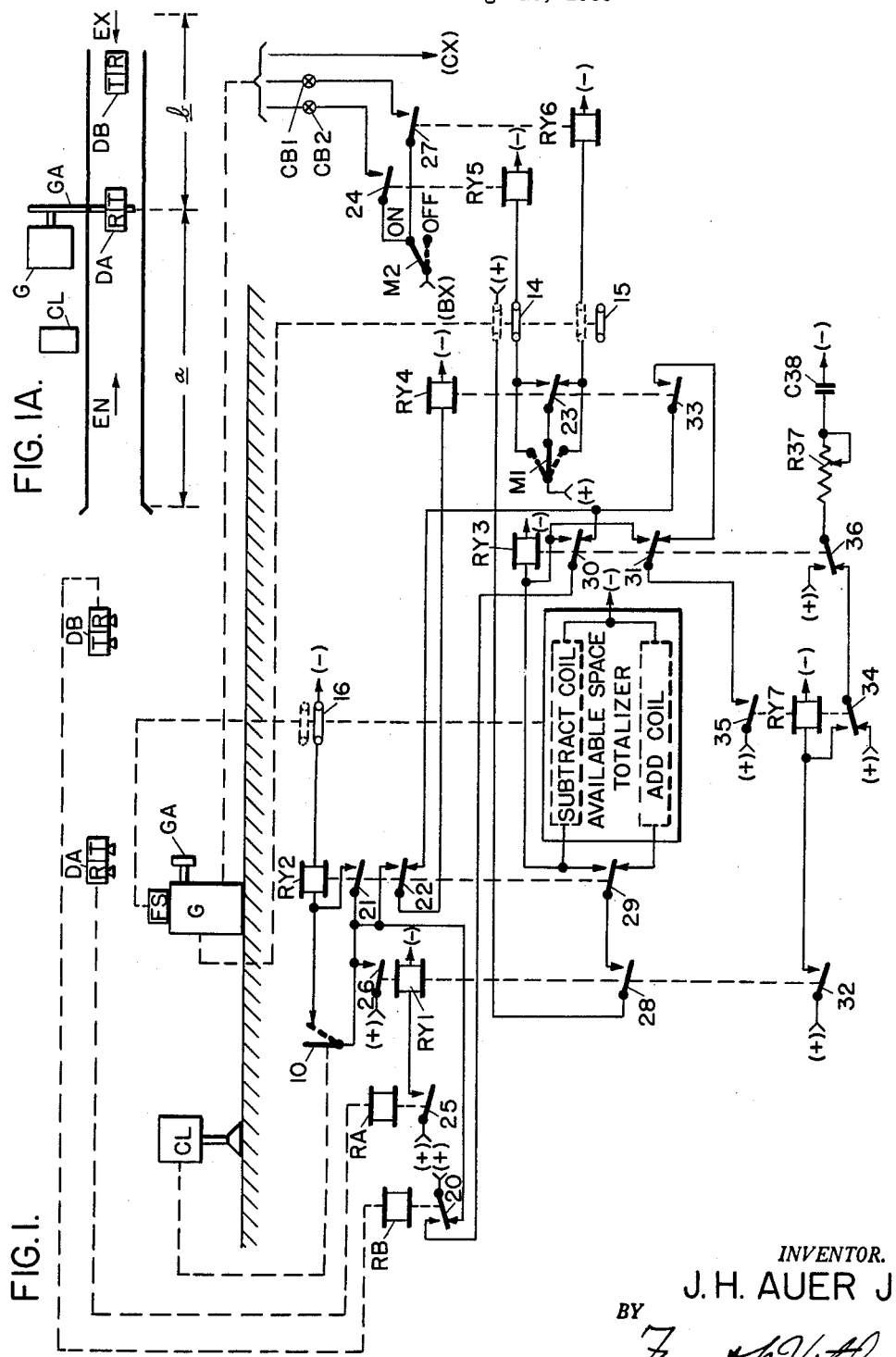

3,046,522
Patented July 24, 1962

3,046,522
GATE CONTROL SYSTEM FOR AUTOMOBILE
PARKING AREAS
John H. Auer, Jr., Rochester, N.Y., assignor to General
Railway Signal Company, Rochester, N.Y.
Filed Aug. 15, 1960, Ser. No. 49,464
6 Claims. (Cl. 340—51)

This invention relates to the control of gates for vehicle parking areas, and more particularly pertains to a control system for a gate at the entrance to an enclosed parking area allowing the individual passage of authorized vehicles in one direction but allowing unrestricted passage of vehicles in the opposite direction together with means providing a count of the available parking spaces of said enclosed parking area.

It has been previously proposed to provide organizations employing gates for the automatic supervision of automobile parking areas thereby eliminating the necessity for the continuous presence of attendants. Whenever such a parking area is provided with an access lane for traffic in both directions with a gate governing the movement of traffic in such lane, the gate is effectively operated to a nonrestricting position by presentation of a coil or coded card or token to a suitable device; and in some instances it has been proposed that the near presence of a vehicle leaving the area through the access lane will cause the gate to be operated to a nonrestricting position.

However, in such previously proposed organizations, it has been found that the individual operation of the gate for each vehicle in a line of vehicles leaving the parking area considerably slows down the passage of the vehicles. This is true even though there is only a partial operation of the gate to a restricting position because that type of operation might cause the drivers of vehicles to partially retard or actually stop their vehicles. Another adverse result of such partial operations is the additional strain and stresses produced in the gate operating mechanism due to quick reversals in direction of movement.

In such prior proposals the partial operation of the gate for each successive vehicle was in part due to the limitations of the control of the gate provided by leaving vehicles. Generally, effective retention of the gate in the elevated position required relatively fixed small spacing between leaving vehicles.

In accordance with the present invention, it is proposed to provide an organization in which the control for a restricting gate may be effected for individual vehicles entering the parking area through the access lane, and yet be effective to hold the gate in its nonrestrictive position continuously for vehicles leaving the parking area through the access lane regardless of whether such vehicles are moving bumper to bumper or whether there is considerable spacing between them.

Although it is proposed that the gate operation be individual with regard to entering the vehicles, and individual for single leaving vehicles but held steadily nonrestrictive for fleeting vehicle exit movements, it is proposed that means be provided for counting the entering and leaving vehicles by the same apparatus effecting control of the gate in such a way as to provide an accurate count of the available parking spaces in the enclosed area. In addition, it is proposed that such available space totalizing means may also be effective to prevent the operation of the gate even for authorized entering vehicles when the totalizing means indicates the parking area to be full.

Thus, one object of the present invention is to provide a control organization for a gate governing traffic movements into and out of parking areas which will always be individual with regard to each entering vehicle but will be adaptable to traffic conditions for leaving vehicles.

Another object of the present invention is to provide vehicle detecting means which can be effective to control the gate under varying traffic conditions and at the same time provide for the accurate operation of an available space totalizer which in turn can under "full" conditions prevent the operation of the gate for authorized entering vehicles.

A still further object of the present invention is to provide two vehicle detecting means, one located adjacent the gate and the other located in approach to the gate in a leaving direction; said detecting means being so spaced that each leaving vehicle will effect the continued actuation of at least one of said detecting means with means responsive to said actuation for retaining the gate steadily in the raised position only for a preselected period of time subsequent to the passage of each leaving vehicle from beneath said detection means adjacent said gate which period of time is proportional to that required by exiting vehicles to travel over that portion of the access road over which such existing vehicles must pass in order to reach the public thoroughfare thereby preventing the entry of unauthorized vehicles by insuring the return of the gate to the barrier position whenever there is no following vehicle exiting behind the currently leaving vehicle within the preselected period of time.

Other objects, purposes and characteristic features of this invention will in part be obvious from the accompanying drawings and in part pointed out as the description of this invention progresses.

In describing this invention in detail, reference will be made to the accompanying drawings in which like reference characters designate corresponding parts in the several views and in which:

FIG. 1 illustrates a parking area system employing the circuit organization of the present invention;

FIG. 1A is a diagrammatic illustration of the arrangement of FIG. 1 as viewed from above.

For the purpose of simplifying the illustration and facilitating in the explanation, the various parts and circuits constituting the embodiment of the invention have been shown diagrammatically and certain conventional elements have been shown in block form, the drawings having been made more with the purpose of making it easy to understand the principles and mode of operation than with the idea of illustrating the specific construction and arrangement of parts that would be employed in practice. The symbols (+) and (—) are employed to indicate the positive and negative terminals respectively of suitable batteries, or other sources of direct current, and the circuits with which these symbols are used always have current flowing in the same direction.

*Structure and Organization*

FIG. 1 illustrates the circuit organization of the present invention. The structural environment of the circuit organization comprises a power operated gate G with a suitable coin or pass lock device CL located about nine or ten feet from the gate arm GA. A display means in the form of a full sign FS is situated on top of the gate G to apprise entering vehicles of the nonavailability of parking spaces when the parking area is filled to capacity.

Mounted above the gate arm GA is a vehicle detector DA with the receiving and transmitting apparatus of said detector indicated by R and T. A second similar vehicle detector DB is mounted in the same plane on the inside of the parking area. The distance between the vehicle detectors DA and DB is governed by the smallest vehicle expected to pass into the parking area and should be such that said vehicle will be detected by the second detector prior to leaving the area of response of the first detector said vehicle had passed under. This is essential, as will subsequently be explained in greater detail, in order to effect proper control of the gate. The vehicle detector is preferably of the ultrasonic type such as shown for example in the prior application of Kendall et al., Ser. No. 808,736 filed April 24, 1959. Another such ultrasonic detector is shown in the Auer application, Ser. No. 820,325 filed June 15, 1959.

It is to be understood that the gate arm GA must be steadily maintained in the raised position during the passage of a vehicle beneath the detectors DA and DB. This is so regardless of whether such vehicle is a convertible or canvas covered truck or open truck with cargo. In order to maintain the gate arm GA in the raised position it is necessary that the relays RA and RB of FIG. 1 be continually energized in accordance with the presence of a vehicle and deenergized whenever there is no vehicle within the area of response of the detectors. Both of these detecting organizations are capable of performing this function.

Referring to FIG. 1 it can be seen that the relays RA and RB respectively controlled by the detectors DA and DB in turn act through the relays RY1, RY2, RY3, RY4, and RY7 subject to the coin or pass lock device CL for actuation of the gate G and the consequent raising and lowering of the gate arm GA.

Referring now to FIG. 1A let us assume that a vehicle is entering a parking area in the direction of the arrow EN. The insertion of a coin or pass in the lock device CL will cause the gate arm GA to be elevated. As the vehicle proceeds into the parking area its presence will be detected by the detector DA thereby maintaining the gate arm GA in a raised position and also energizing the subtract coil of the available space totalizer. As the vehicle proceeds further into the parking area its presence will be detected by the detector DB prior to leaving the area of response of the detector DA. When the vehicle is no longer detected by the detector DA the gate arm GA immediately begins its movement to the barrier position. The downward movement of the gate arm GA will continue as long as the presence of the vehicle is detected by the detector DB and this being the case even if a second authorized vehicle attempts to gain admittance into the parking area by insertion of a coin or pass into the lock device CL. This feature of the circuit organization is to insure proper spacing of entering authorized vehicles. When the presence of the initial entering vehicle is no longer detected by the detector DB the gate arm may again be actuated to the raised position by the insertion of a coin or pass in the lock device CL.

Also, when the vehicle is no longer detected by the detector DB the subtract coil of the available space totalizer is deenergized removing one unit from the total therein in accordance with the one less parking space now available due to the entrance of the authorized vehicle. Whenever an entering vehicle utilizes the last parking space within the area the full sign FS is energized thereby giving notice to the drivers of following entering vehicles of the lack of available parking space. Should the full sign FS become inoperative because of a malfunction or should the driver of an entering vehicle attempt to ignore the notice he will not be able to raise the gate arm GA even if authorized because the circuit organization is designed to prevent the movement of the gate arm GA when the available space totalizer indicates that space is no longer available within the parking area.

The locking arrangement is operative only against entering vehicles and has no effect upon vehicles leaving the parking area. Therefore whenever further space is available within the area due to the exiting of vehicles, entering vehicles are again permitted to actuate the gate arm GA to the raised position by insertion of a coin or pass in the lock device CL.

Now let us assume that a vehicle is leaving the parking area. In this case the gate arm GA is elevated in response to the detection of the vehicle by the detector DB. As the vehicle proceeds in the direction of the arrow EX its presence will be detected by the detector DA prior to leaving detector DB. When the vehicle is detected by the detector DA this causes energization of the add coil of the counting mechanism and also maintains the gate in the raised position. As the vehicle proceeds further in the direction of the arrow EX its presence will no longer be detected by detector DB but the actuation of the detector DA is sufficient to maintain the gate elevated. When the vehicle passes out of the area of response of the detector DA, the add coil of the counting mechanism is deenergized and one unit is added to the available space totalizer in accordance with the parking space made available by the vacating vehicle.

Although the vehicle is no longer detected by the detector DA the gate arm GA will be maintained in the raised position for a period of time preselected in accordance with the physical requirements of a given parking area. In order to be effective in permitting the unrestricted passage of a line of vehicles from the parking area but yet not allow unauthorized vehicles to enter the parking area, the gate arm GA should be maintained in an elevated position after the passage of the initial leaving vehicle only for a period of time equal to the length of time required for an initial leaving vehicle to travel the distance $a$ from the gate arm GA. This delay time insures that when the exciting vehicle ceases to dominate the access road, the gate arm GA begins its movement to the barrier position and no temptation to enter is offered to unauthorized vehicles as would be the case should the gate arm GA remain elevated after the exiting vehicle traveled the distance $a$ and passed out of the access road.

Therefore, should a second following vehicle appear beneath the detector DB during the time an initial leaving vehicle is traveling over that portion of the access road $a$, said second following vehicle will effect control of the gate arm GA and it will be maintained in an elevated position thereby permitting the following vehicle to gain unrestricted passage from the parking area without the distraction which might be engendered were the gate arm GA in a partially lowered condition following the passage of the initial vehicle from the detector DA. Also by elimination of this nonessential movement of the gate arm GA, the wear on the gate mechanism G caused by the quick reversal of the gate arm GA when a following leaving vehicle appears at the detector DB is alleviated.

The gate arm GA may be maintained steadily in the elevated position for a period of time which might well be on the order of five seconds. Therefore, if the speed of the vehicles traveling over the access road was posted at 15 miles per hour, the length $a$ of the access road could be 110 feet and the gate arm would be retained elevated while an exiting vehicle traveled the distance $a$. This time period would be more than sufficient to insure unrestricted movement of a line of leaving vehicles from the normal parking area.

Of course, if no following vehicle appears beneath the detector DB during the preselected period of time for delaying the lowering of the gate arm GA, it will be returned to its barrier position by the time that the initial leaving vehicle passes out of the access road.

More specifically, assuming the parking area is not filled to capacity, the insertion of a coin or pass in the lock device CL causes the momentary actuation of contact 10 to its dotted line position resulting in the energization of relay RY2 through a circuit including (+), back contact 20 of relay RB, contact 10 in its dotted line position, windings of relay RY2, contact 16 in its solid line position and (−). When relay RY2 picks up, it completes a stick circuit from (+), back contact 20 of relay RB, front contact 21 of relay RY2, windings of relay RY2, contact 16 in its solid line position to (−).

The pick up of relay RY2 completes an energizing circuit for relay RY4. The source of energy is applied from (+), back contact 20 of relay RB, front contact 22 of relay RY2, windings of relay RY4 to (−). The manual contact M1 is in the center position, therefore, the closure of front contact 23 by energized relay RY4 causes the completion of a circuit from (+), manual contact M1 in its center position, gate contact 14 in its solid line position, the windings of relay RY5, to (−). The energization of relay RY5 effects the closure of its front contact 24 thereby completing a circuit for actuation of the gate mechanism G which causes the gate arm GA to be elevated. This circuit is completed from (+), the manual contact M2 in its solid line position, front contact 24 of relay RY5 and the gate mechanism G.

When the gate arm GA is elevated, it causes the movement of the gate contact 14 to its dotted line position opening the circuit providing energy to the relay RY5. This relay becomes deenergized but the gate mechanism G is such that the gate arm GA is maintained in the elevated position.

The manual contact M1 is normally in the center position for automatic operation. However, it may be employed to raise and lower the gate manually should maintenance or other conditions warrant it. When the manual contact M1 is moved to the upper position, it completes a circuit for the energization of the relay RY5 and the consequent raising of the gate through a circuit in which energy is supplied from (+), manual contact M1 in its upper position, gate contact 14 in its solid line position, windings of relay RY5, to (−). When the manual contact M1 is operated to its lower position, it completes a circuit for the energization of relay RY6 resulting in the lowering of the gate from its elevated position. The circuit is completed from (+), manual contact M1 in its lower position, gate contact 15 in its dotted line position, the windings of relay RY6 to (−). The energization of relay RY6 closes its front contact 27 completing a circuit through (+) and front contact 27 of relay RY6 which causes the gate to be returned to its barrier position.

The manual contact M2 is an off-and-on contact for at times removing power from the gate G. The circuit breakers CB1 and CB2 are provided for the purpose of protecting the circuits from overload which might be caused by the formation of ice on the gate arm GA or some other causes.

However, under the circumstances assumed, the manual contact M1 is in the center position and, as was previously discussed, the pick up of front contact 23 of energized relay RY4 completed a circuit which energized the relay RY5 through the manual contact M1 in this position.

As the vehicle proceeds further in the direction of the arrow EN its presence will be detected by the detector DA. This causes the energization of the relay RA resulting in the closure of its front contact 25 causing the energization of relay RY1 through an obvious circuit. The energization of relay RY1 closes its front contact 26 thereby applying a second source of energy to the relay RY2 through front contact 21 of relay RY2. The pick up of front contact 26 of relay RY1 also completes a circuit to the windings of the relay RY4 from (+), front contact 26 of relay RY1, front contact 22 of relay RY2, the windings of relay RY4 to (−).

Therefore, it can be seen from the above that as long as the presence of the entering vehicle is detected by the detector DA the gate arm will be maintained in its raised position. This is so because as long as the relay RY1 is energized in response to the pick up of front contact 25 of relay RA, the same source of positive energy will be applied through front contact 26 of relay RY1 to the windings of relay RY2 and simultaneously be applied to the windings of relay RY4 through front contact 22 of energized relay RY2.

The energization of relay RY1 also picks up its front contact 28 thereby completing a circuit for the simultaneous energization of the subtract coil of the available space totalizer and the relay RY3 since relay RY2 is already picked up closing front contact 29. The circuit includes (+), gate contact 14 in its dotted line position, front contact 28 of relay RY1, front contact 29 of relay RY2 and at this point a dual circuit is provided with one portion of the circuit being completed through the subtract coil of the available space totalizer to (−) and a second leg being completed through the windings of relay RY3 to (−). The energization of relay RY1 also picks up its front contact 32 completing an obvious circuit for the energization of repeater relay RY7.

Now when the energized relay RY7 picks up its front contact 34 it does not effect a stick circuit for the maintenance of RY7 in its energized condition due to the simultaneous energization of relay RY3 and the pick up of its front contact 36 which effectively isolates the variable resistor R37 and the capacitor C38 from the windings of RY7. The energization of relay RY7 also causes the pick up of its front contact 35 thereby completing a stick circuit for the relay RY3 which includes (+), front contact 35 of relay RY7, front contact 31 of relay RY3, the windings of relay RY3 and (−).

As the vehicle proceeds further in the direction of the arrow EN its presence will be detected by the detector DB prior to leaving the area of response of the detector DA. This causes the energization of relay RB and the pick up of its front contact 20 completing a second stick circuit for the relay RY3. This circuit includes (+), front contact 20 of relay RB, front contact 30 of relay RY3, the windings of relay RY3 and (−). In addition, the energy supplied to front contact 30 of relay RY3 is also simultaneously applied to the subtract coil of the available space totalizer.

When the presence of the entering vehicle is no longer detected by the detector DA relay RA drops away opening its front contact 25 thereby removing energy from the windings of relay RY1. The denergization of relay RY1 opens its front contact 26 removing the remaining source of energy from the windings of relay RY2. It should be remembered that RY2 was also retained in its energized condition through the source of positive energy applied through back contact 20 of relay RB. The deenergization of relay RY2 opens its front contact 22 removing the energy maintaining the relay RY4 in its picked up condition. The drop away of relay RY4 effects closure of its back contact 23. This completes a circuit including (+), manual contact M1 in its center position, back contact 23 of relay RY4, gate contact 15 in its dotted line position, the windings of relay RY6 to (−). The energization of relay RY6 picks up its front contact 27 completing a circuit to the gate mechanism G for returning the gate arm GA to its barrier position.

The opening of front contact 28 of relay RY1 in accordance with the deenergization of that relay removes one source of energy from the subtract coil of the available space totalizer, but the subtract coil is not actually deenergized to remove one unit from the total appearing thereon to account for the one less space available in the parking area because of the entering vehicle until relay RB is released, as later described in detail. Should the entering vehicle occupy the last remaining space in the parking area, the totalizer mechanism will actuate the contact 16 to its dotted line position thereby providing energy to the full sign FS and giving notice to following entering vehicles that spaces are no longer available in the parking area. Should the full sign FS become inoperative for any reason or should an entering vehicle choose to ignore the full sign FS, insertion of a coin or pass in the lock device CL will not cause the gate arm GA to be elevated. This is so because the movement of the contact 16 to its dotted line position renders ineffective the momentary actuation of contact 10 for energizing relay RY2 by opening the energizing circuit.

The deenergization of relay RY1 causes the drop away of its front contact 32 removing energy from the windings of the relay RY7. The drop away of relay RY7 opens its front contact 35 opening one stick circuit maintaining the relay RY3 in an energized condition. However, energy is still maintained on the windings of relay RY3 through front contact 20 of relay RB and front contact 30 of relay RY3. It can be seen therefore that the energization of relay RY3 effectively isolates the source of energy which might have been applied through front contact 20 of relay RB and back contact 22 of relay RY2 to the windings of relay RY4. Thus as long as the entering vehicle is detected by the detector DB the gate arm GA will be retained in its downward going direction. The insertion of a coin or pass in the lock device CL will not effect the energization of relay RY2 because energized relay RB and its picked up front contact 20 causes the momentary actuation of contact 10 to be ineffective by removing the source of positive energy provided by back contact 20 of relay RB for energizing relay RY2. Therefore a following entering vehicle must wait at the lock device CL until the initial entering vehicle has passed beyond the area of response of the detector DB thus insuring proper spacing between entering vehicles. Should an unauthorized vehicle attempt to follow the authorized vehicle into the parking area while the first entering vehicle is under the detector DB, the gate arm GA will continue to proceed downwardly striking the unauthorized vehicle.

However, as soon as the entering vehicle leaves the detector DB the relay RB becomes deenergized opening its front contact 20 thereby opening the stick circuit for relay RY3 through its front contact 30, and simultaneously deenergizes the subtract coil of the available space totalizer. The drop away of relay RY3 restores the circuit to its original condition and then a following vehicle can by insertion of a coin or pass in the lock device CL actuate contact 10 and effect the raising of the gate.

Let us now assume that a vehicle is leaving the parking area in the direction of the arrow EX and is detected by the detector DB. This will cause energization of relay RB and the pick up of its front contact 20 completing a circuit for energizing relay RY4 which circuit includes (+), front contact 20 of relay RB, back contact 30 of relay RY3, back contact 22 of relay RY2, the windings of relay RY4 and (−). The energization of relay RY4 picks up its front contact 23 thereby completing a circuit which energizes relay RY5. This circuit includes (+), manual contact M1 in its center position, front contact 23 of relay RY4, contact 14 in its solid line position, the windings of relay RY5 and (−). When relay RY5 becomes energized it picks up its front contact 24 completing the circuit for actuating the gate mechanism G and causing the gate arm GA to be raised to its elevated position. The elevation of the gate arm causes the contact 14 to be moved to its dotted line position thereby deenergizing the relay RY5 but the gate mechanism G is such that the gate arm GA is retained in its elevated position.

As the vehicle proceeds further out of the parking area in the direction of the arrow EX, its presence will be detected by the detector DA prior to leaving the area of response of the detector DB. When the leaving vehicle is detected by the detector DA it causes the relay RA to become energized picking up its front contact 25 resulting in the energization of the relay RY1 through an obvious circuit.

The energization of relay RY1 picks up its front contact 28 thereby energizing the add coil of the available space totalizer by completion of a circuit from (+), gate contact 14 in its dotted line position, front contact 28 of relay RY1, back contact 29 of relay RY2, the windings of the add coil and (−).

The energization of relay RY1 also causes the pick up of its front contact 32 resulting in the energization of relay RY7 which picks up its front contact 34. This completes a timing stick circuit for the relay RY7 from (−), capacitor C38, variable resistor R37, back contact 36 of relay RY3, front contact 34 of relay RY7, the windings of relay RY7 and (−). The positive source of energy for maintaining the capacitor C38 in a charged state is provided through front contact 32 of now energized relay RY1.

The pick up of relay RY7 also effects closure of its front contact 35 thereby completing a circuit for applying a second source of energy to the windings of relay RY4. This circuit includes (+), front contact 35 of relay RY7, back contact 31 of relay RY3, front contact 33 of relay RY4, back contact 22 of relay RY2, the windings of relay RY4 and (−). As the retention of the gate in its elevated position is made posible by the maintenance of front contact 23 of relay RY4 in that condition it can be seen that as long as the relay RY7 is energized the gate will remain in its raised position.

As the vehicle proceeds further out of the parking area its presence will no longer be detected by the detector DB. This causes the deenergization of the relay RB and the consequent drop away of its front contact 20 opens one circuit applying positive energy to the windings of relay RY4. However, as previously discussed relay RY4 is maintained in its energized condition by the application of the positive source of energy through front contact 35 of relay RY7.

When the movement of the vehicle in the direction of the arrow EX is such that it is no longer detected by the detector DA, the relay RA becomes deenergized dropping away its front contact 25 opening the obvious circuit maintaining relay RY1 in an energized condition. The deenergization of relay RY1 opens its front contact 28 thereby removing energy from the add coil of the available space totalizer and adding one unit to the total appearing thereon in accordance with the one parking space now made available by the leaving vehicle. Should the currently exiting vehicle be the initial vehicle leaving a parking area formerly filled to capacity it will actuate the available space totalizer in such manner as to remove energy from the full sign and return the contact 16 from its dotted line position thereby enabling an authorized vehicle to enter the parking area and occupy the space vacated by the present leaving vehicle.

The deenergization of relay RY1 also causes the drop away of its front contact 32 removing energy from the windings of the relay RY7. Due to the effect of the timing stick circuit, incorporating the resistor R37 and capacitor C38, the relay RY7 will not drop away immediately but will be maintained in its energized condition for the period of time until the charge on the capacitor C38 is no longer sufficient to retain the relay RY7 in its energized state. Therefore by proper selection of values of the resistor R37 and capacitor C38 energy may be maintained on the relay RY7 for a period of time commensurate with the time required for the present exiting vehicle to traverse the distance a of the access road at the posted rate of speed. As the gate arm GA will be maintained in its elevated position as long as positive energy is applied to the windings of the relay RY4 through front contact 35 of relay RY7 said gate arm GA will not be moved from its elevated position until elapse of the predetermined time then being measured during which the exiting vehicle is leaving through the access road and thus prevents the entrance of any vehicle during such time. Should a second exiting vehicle appear beneath the detector DB prior to the time the capacitor C38 has discharged sufficiently, through the resistor R37, back contact 36, of relay RY3, front contact 34 of relay RY7, the windings of relay RY7 and (−), to allow the relay RY7 to drop away, the gate will be maintained in its elevated position by the energization of the relay RB picking up its front contact 20 and again completing the circuit to the relay RY4 from (+), front contact 20 of relay RB, back contact 30 of relay RY3, back contact 22 of relay RY2, the windings of relay RY4 to (—).

It is to be noted, therefore, that by correlating the resistor R37 and capacitor C38 time constant with the time required for a first leaving vehicle traveling at a posted rate of speed over the distance a of the access road, gate arm GA remains steadily elevated and provides unrestricted exit movement for any following leaving vehicle which may appear beneath the detector DB while the first leaving vehicle is still at some point in that portion a of the access road. Also, the elevated gate arm GA offers no invitation to unauthorized vehicles to enter the parking area as the access road is dominated by a leaving vehicle and, as soon as said leaving vehicle reaches the end of the access road, the gate arm GA is returned to the barrier position provided no second leaving vehicle arrives beneath the detector DB to retain the gate arm GA in its elevated position and occupy the access road.

Earlier it was stated that one of the structural requirements of the organization was that the placement of the detectors DA and DB should be such that the smallest vehicle likely to move beneath them would be detected by the second detector prior to leaving the area of response of the first detector. This is desirable for traffic in both directions. During exit movement this requirement is necessary in order to maintain the gate arm GA steadily in the raised position while a leaving vehicle passes from the detector DB to detector DA.

If the gate arm GA is to be steadily maintained in a raised position for a following vehicle, then such following vehicle must be detected by the detector DB before the leading vehicle ceases to be detected by the detector DA. This means then that to maintain the gate arm GA steadily raised for a succession of following vehicles, such vehicles must be spaced distances not greater than the distance between the detectors DA and DB. To allow following vehicles to be spaced at a greater distance, it is proposed in accordance with the present invention to provide a predetermined time during which the gate will remain upraised even after the detector DA ceases to detect a leaving vehicle. This is accomplished by the insertion of capacitor C38 and resistor R37 in what is termed the timing stick circuit for relay RY7. Although the values of this capacitor and resistor may be selected to provide any suitable desired time, it is proposed in accordance with the present invention that this time be selected commensurate with the time required for a vehicle to pass through the access row over the distance a at the posted speed.

If the second leaving vehicle does not appear beneath the detector DB prior to the elapse of the predetermined time during which the first leaving vehicle is travelling through the distance a of the access road, the capacitor C38 will have discharged sufficiently, through resistors R37, back contact 36 of relay RY3, front contact 34 of relay RY7, the windings of relay RY7 to (—), to enable relay RY7 to drop away.

The deenergization of relay RY7 also causes the opening of its front contact 35 thereby opening the remaining circuit supplying energy to the windings of relay RY4 through back contact 31 of relay RY2, front contact 33 of relay RY4, back contact 22 of relay RY2, windings of relay RY4 to (—). When the relay RY4 is deenergized, it completes a circuit for the energization of relay RY6 which circuit includes (+), manual contact M1 in its center position, back contact 23 of relay RY4, contact 15 in its dotted line position, windings of relay RY6 and (—). The energization of relay RY6 closes its front contact 27 actuating the gate mechanism G and restoring the gate arm GA to its barrier position in the manner previously described herein. Incidently, the closure of back contact 34 completes an obvious circuit for the recharging of capacitor C38.

This organization is thus adapted to the control of traffic into and out of a parking area in such manner that entering vehicles are restricted to those having a required coin or pass; and while restricted exit movement is provided for individual leaving vehicles, unrestricted exit movement is provided for a line of leaving vehicles by the retention of the gate in its elevated position during such fleet exit moves without offering any opportunity for unauthorized entry to be attained while the gate arm is elevated. The organization also permits counting of the number of spaces available within a parking area even while maintaining the gate elevated during the time a line of vehicles is leaving said parking area and restricts further entry of vehicles when the parking area is filled to capacity.

When the requirements of a given parking area are such that the available space totalizer is not essential, as would be the case if a business organization maintains a parking area with reserved spaces for their employees or in a small commercial lot in which the space available may be easily ascertained, a more simplified circuit may be employed for retaining the gate in its raised position during exit movement of a line of vehicles.

Such an arrangement permits a more simplified circuit since the use of the combination of the available space totalizer and the circuit for delaying the lowering of the gate during exit movement of a line of vehicles requires the inclusion of the repeater relay RY7 in the organization. Referring to FIG. 1, it can be seen that this is necessary in order that the relay RY1 through its front contact 28 may operate on the available space totalizer for each departing vehicle in a line of vehicles leaving the parking lot while repeater relay RY7 maintains the gate arm GA in the raised position. Therefore, if the operation of the available space totalizer is eliminated as a function of relay RY1, the resistor R37/capacitor C38 stick circuit may be employed directly with the relay RY1 and the repeater relay RY7 eliminated. Of course, contact 32 of relay RY1 must then be utilized to perform the present functions of contact 35 of the repeater relay RY7.

Again, the basic circuit may be adapted to another modification in that the available space totalizer may be used without the circuitry required for retaining the gate in its elevated position during exit movement of a line of vehicles from the parking area. Such a circuit organization might be desirable in a large parking area where the exit movement occurs individually throughout the course of the day. This arrangement, again, permits the elimination of the repeater relay RY7 from the circuit organization and, again, contact 32 of relay RY1 is used directly to perform the functions of contact 35 of relay RY7.

It should also be appreciated that in practicing the principles of the present invention alternative embodiments may be used, since in its broadest aspect the invention relates to apparatus for restricting the movement of vehicles in one direction in such a way that the restricting means must be operated for individual vehicles but for movements in the opposite direction vehicles may pass in a continuous flow and steadily maintain the restricting means in a non-restricting condition. For example, one alternative organization would be to have a series of detectors to the left of detector DA in FIG. 1A located at distances from detector DA and from each other a distance equal to the distance between detectors DA and DB with all of such series of detectors connected in multiple with the detector DA so as to be effective only for leaving vehicles. Another form could be embodied by the use of one or more detectors to the right of the detector DB in FIG. 1A and spaced from the detector DB and each other a distance equal to the distance between the detectors DA and DB. Such detectors would be connected in multiple with the detector DB so as to be effective only for leaving vehicles. In this way, the distance between the detectors DA and the first of the added detectors to the right of DB to be encountered by a leaving vehicle would determine the distance required between successive cars of a line of leaving vehicles. Also, in the event a single exiting vehicle might pass the gate GA, such gate would be restored as soon as such vehicle left the detecting zone of the detector DA. It is thus apparent from the consideration of these alternative organizations, that the scope of the present invention is such as to comprehend quite different structural embodiments.

The particular embodiment of my invention, shown and described, has been selected in order to facilitate the disclosure of the invention rather than limit the number of forms which it may assume; and it is to be understood that various modifications, adaptations and alterations may be applied to this specific form shown to meet the requirements of practice, without in any manner departing from the spirit or scope of the present invention.

What I claim is:

1. A system for selectively controlling the passage of vehicles through a passageway comprising in combination, means operable between vehicle blocking and non-blocking conditions at a predetermined distance from one end of said passageway, said passageway from said one end thereof to at least the location of said barrier means being a single lane passageway, operating means for operating said barrier means selectively between its blocking and non-blocking conditions, detection means being distinctively controlled by the presence of a vehicle approaching said barrier means from a side thereof which is opposite said one end of said passageway, said operating means being controlled at least in part by said detection means when it has detected the presence of a vehicle to operate said barrier means to its non-blocking condition and for maintaining said barrier means in said non-blocking condition until said vehicle has passed said barrier means, and means connected to said operating means to maintain said barrier in its said non-blocking condition when once operated thereto by said detection means for at least the expected time required for a vehicle to travel from the location of said barrier means to said one end of said passageway, control means accessible to the operator of a vehicle passing along said passageway between said one end and said barrier means and connected to said operating means for operating said barrier means to its non-blocking position, said detection means being differently controlled by vehicles according to their direction of travel through said passageway and controlling said operating means to operate said barrier means to its non-blocking condition only for a vehicle travelling toward said one end, whereby a vehicle passing through said one end of said passageway and travelling toward the barrier means can pass said barrier means only if said barrier means has been operated to its non-blocking condition by said control means and whereby successive vehicles passing through said passageway toward said one end thereof and sufficiently closely spaced so that the second thereof is detected by said detector means before the first thereof has emerged from said one end of said passageway, will cause said barrier means to constantly remain in said non-blocking condition.

2. The combination of claim 1 which further includes restoring means governed by said detector means when said detector means has detected a vehicle in said passageway and travelling away from said one end thereof for controlling said operating means to operate said barrier means to its blocking condition irrespective of said control means when said vehicle has passed said barrier means.

3. The invention as defined in claim 2 wherein said control means can control said operating means to operate said barrier means to said non-blocking condition after said restoring means has controlled said operating means to operate said barrier means to its blocking condition only after said barrier means has fully operated to its said blocking position.

4. The combination of claim 1 wherein said passageway provides access to a confined area having a predetermined vehicle capacity, said combination further including counting means controlled at least in part by said vehicle detection means and being selectively controlled according to the direction of travel of each vehicle through said passageway, said counting means adding a single count for each vehicle passing said barrier means in one direction and subtracting a count for each vehicle passing said barrier means in the opposite direction, and means governed by said counting means when the count registered thereby substantially equals said predetermined number for preventing the operation of said barrier means to its non-blocking condition by said control means.

5. Apparatus for controlling the passage of vehicles through a passageway comprising, barrier means operable between vehicle blocking and non-blocking conditions and being located a predetermined distance from one end of said passageway, said passageway being a single lane passageway at least from the location of said barrier means to said one end of said passageway, operating means for operating said barrier means selectively between its said blocking and non-blocking positions, detection means being distinctively controlled by the presence of a vehicle approaching said barrier means from the side thereof which is opposite said one end of said passageway, said operating means being controlled at least in part by said detection means at any time that said detection means indicates the presence of a vehicle to operate said barrier means to its non-blocking condition and for maintaining said barrier means in said non-blocking condition until said vehicle has passed said barrier means and for at least the expected time required for a vehicle to travel from the location of said barrier means to said one end of said passageway, whereby for successive vehicles passing through said passageway toward said one end thereof and sufficiently closely spaced so that the second thereof is detected by said detector means before the first thereof has emerged from said one end of said passageway, said barrier means will constantly remain in said non-blocking condition.

6. The invention as defined in claim 5 wherein said means connected to said operating means comprises timing means demarcating a fixed time interval throughout which said barrier means is maintained in its non-blocking condition after a vehicle travelling toward said one end has passed said barrier means.

References Cited in the file of this patent

UNITED STATES PATENTS

| 1,924,533 | Babson | Aug. 29, 1933 |
| 2,528,790 | Scherer | Nov. 7, 1950 |
| 2,751,574 | Jeffers | June 19, 1956 |
| 2,878,998 | Spencer | Mar. 24, 1959 |
| 2,931,010 | Geiser | Mar. 29, 1960 |

OTHER REFERENCES

American City, June 1957, page 156.